(12) United States Patent
DiSabatino (10) Patent No.: US 11,292,148 B2
(45) Date of Patent: Apr. 5, 2022

(54) CUTTING DEVICE TOOTH MOUNTING ARRANGEMENT

(71) Applicant: Deere & Company, Moline, IL (US)

(72) Inventor: Benjamin DiSabatino, Brantford (CA)

(73) Assignee: DEERE & COMPANY, Moline, IL (US)

( * ) Notice: Subject to any disclaimer, the term of this patent is extended or adjusted under 35 U.S.C. 154(b) by 655 days.

(21) Appl. No.: 14/861,094

(22) Filed: Sep. 22, 2015

(65) Prior Publication Data

US 2017/0080594 A1    Mar. 23, 2017

(51) Int. Cl.
*B27B 33/12*    (2006.01)
*A01G 23/091*   (2006.01)

(52) U.S. Cl.
CPC ............ *B27B 33/12* (2013.01); *A01G 23/091* (2013.01); *Y10T 83/9329* (2015.04); *Y10T 83/9331* (2015.04)

(58) Field of Classification Search
CPC ..... B27B 33/12; B27B 33/144; B27B 33/148; A01G 23/091; Y10T 83/9319; Y10T 83/9321; Y10T 83/9324; Y10T 83/9326; Y10T 83/9329; Y10T 83/9331; Y10T 83/9333; Y10T 83/9336; Y10T 83/9338; Y10T 83/9341
USPC .................................................. 83/835–844
See application file for complete search history.

(56) References Cited

U.S. PATENT DOCUMENTS

| | | | |
|---|---|---|---|
| 4,932,447 A | | 6/1990 | Morin |
| 5,307,719 A | * | 5/1994 | MacLennan ........... B23D 61/04 83/839 |
| 6,435,434 B1 | * | 8/2002 | Monyak ............... B02C 13/2804 241/197 |
| 6,464,157 B1 | * | 10/2002 | Balvanz et al. .... B02C 13/2804 241/191 |
| 6,769,343 B2 | | 8/2004 | DiSabatino |
| 6,810,783 B1 | * | 11/2004 | Larose ................... B23D 61/06 144/34.1 |

(Continued)

FOREIGN PATENT DOCUMENTS

| | | | |
|---|---|---|---|
| DE | 31 42 068 A1 | * 5/1983 | ........... B27B 33/144 |
| WO | 2010/148471 A1 | * 12/2010 | ............. B27B 33/12 |

OTHER PUBLICATIONS

John Deere, Saw Teeth Blades Brochure, Admitted Prior Art.
John Deere, Track Feller Bunchers & Harvesters 909J and 959J, Brochure, Admitted Prior Art.

*Primary Examiner* — Clark F Dexter
(74) *Attorney, Agent, or Firm* — Klintworth & Rozenblat IP LLP (57) ABSTRACT

A saw disc assembly includes a circular plate having a mounting lug defining a V-shaped lug mounting profile extending between first and second sides of a tooth mount. A cutting tooth includes a shank-less body defining a cutting profile at a cutting face of the body and a mounting profile at a mounting face of the body having a configuration for complementary engagement with the lug mounting profile. The tooth mounting profile has first and second flat surfaces engageable with the lug mounting profile so that when the tooth is mounted to the lug, the flat surfaces positively resist rotation of the tooth with respect to the lug about the fastener, while a radially inner side of the tooth extending between the cutting and mounting faces is spaced from the lug and the cutting device.

6 Claims, 7 Drawing Sheets

(56) References Cited

U.S. PATENT DOCUMENTS

| | | | |
|---|---|---|---|
| 7,568,645 B2 * | 8/2009 | Doppstadt | B02C 13/28 |
| | | | 241/194 |
| 7,634,897 B2 | 12/2009 | MacLennan et al. | |
| 7,828,026 B2 | 11/2010 | MacLennan et al. | |
| 8,061,396 B2 | 11/2011 | MacLennan et al. | |
| 8,066,213 B2 * | 11/2011 | Marquardsen | B02C 13/2804 |
| | | | 241/242 |
| 8,540,033 B2 * | 9/2013 | Stanley et al. | A01B 33/142 |
| | | | 172/548 |
| 9,038,933 B2 * | 5/2015 | Fredsall | B02C 18/145 |
| | | | 241/300 |
| 9,604,222 B2 * | 3/2017 | Fredsall | B02C 18/184 |
| 2004/0056129 A1 * | 3/2004 | Doppstadt | B02C 18/18 |
| | | | 241/194 |
| 2014/0260876 A1 | 9/2014 | MacLennan et al. | |

* cited by examiner

CUTTING DEVICE TOOTH MOUNTING ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to cutting devices, such as large saw discs for work vehicles or harvesting implements used in the forestry industry.

BACKGROUND OF THE DISCLOSURE

Various work vehicles and harvesting implements may include a rotary cutting device. In the forestry industry, for example, a wheeled or tracked feller buncher may have a felling head with a circular saw that is used to cut down standing trees. Saw discs of this type having a large diameter (e.g., up to 58 inches/1,473 mm or more) circular plate (e.g., over 1 inch/25 mm thick) with a number of large cutting teeth (e.g., 16-20) arranged on mounting lugs spaced around the circumference of the disc. The large size and operational speed (e.g., 1,275 rpm) of such saw discs generate high inertial forces that may allow the saw discs to rapidly cut through the full trunk of the tree in a single pass. This cutting processing thus imparts high forces on the disc teeth that cause significant wear over time. Thus, it is beneficial to have a tooth assembly and mounting arrangement which are secure, and yet allow for the teeth to be replaced, or otherwise adjusted for positioning a sharpened cutting edge in the cutting plane of the saw disc path.

SUMMARY OF THE DISCLOSURE

This disclosure provides a cutting tooth configuration and a mounting arrangement for the cutting teeth on a cutting device that is secure, while at the same time readily adjustable for repositioning and/or replacing a sharpened cutting edge of the teeth in the cutting path.

In one aspect the disclosure provides a tooth for a cutting device that may have a tooth mounting lug defining a V-shaped lug mounting profile extending between first and second sides of the tooth mount in a radial or axial direction of the mounting lug. The tooth may have a shank-less body defining a cutting profile at a cutting face of the body and a tooth mounting profile at a mounting face of the body having a configuration for complementary engagement with the lug mounting profile. The tooth body may have a through hole extending from the cutting face through the mounting face for receiving a fastener to mount the tooth to the lug. The tooth mounting profile may have first and second flat surfaces engageable with the lug mounting profile so that the flat surfaces positively resist rotation of the tooth with respect to the lug about the fastener when the tooth is mounted to the lug. In this position, a radially inner side of the tooth extending between the cutting and mounting faces is spaced from the lug and the cutting device.

In another aspect the disclosure provides a tooth assembly for a cutting device, including a tooth and a tooth mount. The tooth mount may be fixed with respect to the cutting device and define a first mounting profile with first and second flat mount surfaces extending between first and second sides of the tooth mount in a radial or axial direction of the tooth mount. The tooth is mountable to the tooth mount and may define a second mounting profile, opposite a cutting profile of the tooth. The second mounting profile has first and second flat tooth surfaces extending between first and second sides of the tooth in the direction of the cutting device along which the first and second flat mount surfaces extend. One of the first and second mounting profiles may define a V-shaped mounting groove and the other of the first and second mounting profiles may define a mounting projection configured to inter-fit with the mounting groove such that the first and second flat mount surfaces engage the respective first and second flat tooth surfaces. A radially inner side of the tooth may be spaced from the tooth mount and the cutting device.

In still another aspect the disclosure provides a cutting device including a circular plate that may be disposed concentrically about a rotation axis and centered on a reference plane which is perpendicular to the rotation axis. The circular plate may have an outer peripheral edge defining a plurality of mounting lugs extending radially out from the outer peripheral edge and spaced apart angularly along the outer peripheral edge. The mounting lugs may form tooth mounts, each defining a first mounting profile forming a V-shaped groove with first and second flat mount surfaces centered about the reference plane and extending between first and second sides of the mounting lug in a radial or axial direction of the saw disc parallel to the rotation axis of the saw disc. A plurality of teeth may be mountable to the mounting lugs, each tooth defining a second mounting profile opposite a cutting profile of the tooth. The second mounting profile may have first and second flat tooth surfaces extending between first and second sides of the tooth in the radial or axial direction. When mounted to the tooth mount, a radially inner side of the tooth is spaced from the outer peripheral edge of the circular plate. A plurality of fasteners may couple the teeth to the mounting lugs. Each of the fasteners extends along an axis contained in the reference plane and clamping the flat tooth surfaces against the flat mount surfaces.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following detailed description includes one or more example embodiments of the disclosed cutting tooth configuration and mounting arrangement for a saw disc, as shown in the accompanying figures of the drawings described briefly above. Various modifications to the example embodiments may be contemplated by one of skill in the art.

The present disclosure provides an improved cutting tooth and arrangement for mounting cutting teeth on mounting lugs of a saw disc. The disclosed tooth configuration and mounting arrangement is particularly useful for large saw discs used in industrial applications, such as for felling trees in the forestry industry. However, the cutting tooth configuration and mounting arrangement may be useful for saw discs used in other applications and industries.

In one perspective, aspects of the disclosed tooth configuration and mounting arrangement better ensure a robust, secure connection of the cutting teeth to the mounting lugs, which is useful for maintaining secure engagement and proper alignment of the cutting teeth with the saw disc during cutting operations. Reducing misalignment of the cutting teeth, which can slow the cutting operation and dull the cutting edges of the teeth, may be particularly useful for cutting operations, such as tree felling, in which the saw disc is large, such that the saw disc, and thereby the cutting teeth, engage the cut at high angular velocities and corresponding high impact forces on the cutting teeth. In certain embodiments, the mounting interface between the teeth and the lugs may have flat engaging surfaces that positively retain the tooth in a cutting alignment.

From another perspective, the disclosed tooth configuration and mounting arrangement may be considered as facilitating the replacement of the cutting edges. In certain embodiments, the disclosed cutting tooth configuration may have a double-edged, or otherwise multi-sided, cutting profile in which one, or some number fewer cutting edges of the cutting profile are arranged in the cutting path of a particular cutting operation. The mounting arrangement disclosed allows for one cutting edge to be replaced by another cutting edge at the cutting path without completely disassembling the tooth from the saw disc, thus reducing the time and complexity required to change cutting edges.

For example, in certain embodiments, the configuration of the disclosed cutting teeth and mounting lugs allows for one tooth rotation of 180 (or other) degrees to reposition a new cutting edge in the cutting path of the saw disc. The tooth may be indexed by loosening and removing a single retention bolt and rotating the tooth 180 degrees. In certain embodiments, such as one having a sufficiently shallow tooth mounting interface and a bolt of sufficient length, the tooth may be indexed by loosening and rotating the tooth without removing the fastener and dismounting the tooth. Such indexing may be aided in part by the radially inner side of the tooth being spaced from the outer peripheral edge of the lug and/or the saw disc so that the tooth may be rotated without being dismounted entirely and without an edge or side surface of the tooth contacting the mounting lug or the saw disc. The periphery of the saw disc may have a relief formed adjacent the mounting lug to provide this spacing of the radial inner side of the tooth without requiring the radial inner side of the tooth to be spaced radially outward of the nominal outer diameter of the saw disc.

In yet another perspective, the disclosed tooth configuration and mounting arrangement may be considered to simplify the manufacturing required to produce a saw disc of the type disclosed. For example, in certain embodiments, mounting lugs may be cut into, or formed as part of, the periphery of a tooth or saw disc. For example, in some embodiments the saw disc may be a steel plate, and each tooth may be a casting or forging, although other conventional processes may be used for both the saw disc and the teeth. Aspects of the disclosed cutting tooth and lug configuration may allow the entire periphery to be machined with a reduced need to change tool sizes. A multi-pass machining operation, including for example a rough cut pass and a finishing cut pass, may be used to machine each tooth and the periphery of the saw disc. By avoiding small radii areas, a single cutting tool may be used for each of the rough and finishing passes to machine each tooth and the entire periphery of the saw disc. For example, the mounting profiles of the teeth and the lugs may extend full-width across these components so as to avoid creating interior surfaces or tight-radius corners that require machining. Further, the aforementioned relief in the periphery of the saw disc also avoids the need for square corners in a radial direction or radii smaller than the cutting tool, such that the teeth are mounted at the lugs without interference with the remainder of the saw disc, which greatly reduces the level of precision required in machining at the interface of the teeth and saw disc.

Assembly is also made easier by certain aspects of the tooth configuration and the mounting arrangement disclosed. For example, the cutting tooth may be shank-less and a separate threaded fastener (e.g., a bolt) may be used to secure a tooth to its mounting lug. Moreover, the bolt or other threaded fastener may be mounted from the exposed cutting face side of the cutting tooth rather than from a concealed or low-access area of the device. In the case of a bolt, its enlarged head may be received in a multi-sided recess or pocket such that not only is it located not to interfere with the cutting plane, the tooth may be installed and adjusted with a single tool (e.g., a screw or socket driver) without the need to hold the bolt with a second tool. Furthermore, neither the tooth nor the mounting lug would need to be tapped with a threaded opening, or only one of the tooth and the lug would need to be tapped if no nut was used. The tooth and the lug each could simply have a through bore (e.g., from a drilling operation), without the need to thread the tooth bore or the lug bore for the bolt opening. Further, an unthreaded portion shank of the bolt is in shear at the tooth-mounting lug interface, thus maximizing the shear area for a given bolt diameter, and with the bolt head located in the recess, it will not interfere with cutting or material flow.

In certain embodiments, the tooth and the lug may have complementary interlocking groove and projection mounting profiles. For example, the tooth may have a generally V-shaped mounting face that matches with a generally V-shaped mounting profile formed in the lug. In this regard, the "V-shaped" as used herein in refers to a profile configuration having a cross-section with two converging flat sides. It should be understood that the converging flat sides need not be symmetrical with, or at the same angle to, a central plane, nor do the flat sides need to intersect along a common centerline. Rather, the area between the converging flat surfaces (i.e., the projecting bottom of the "V" in the male component or the bottom of the valley or groove of the female component) may define a sharp edge line and angle included, or it may be rounded or flat. The use of mating flat surfaces provides a positive, anti-rotation feature of the mounting arrangement to maintain proper tooth alignment during cutting operations. However, the converging angulation of these flat surfaces, may in some cases, allow the tooth to be indexed (e.g., rotated 180 degrees) when the tooth is loosened, but still retained to the lug, to swap cutting edges. Further, it should be understood that the tooth may form the projection, or male V-shaped component, and the lug may form the groove or valley, or female V-shaped component, or vice versa.

The valley of the V-shaped mounting profiles may run in either a radial or an axial direction with respect to the saw disc. In this regard, as used herein, the term "axial" refers to a direction that is generally parallel to an axis of rotation, axis of symmetry, or centerline of a component or components. For example, in a cylinder or disc with a centerline and opposite, generally circular ends or faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

The mounting profiles of the tooth and/or the lug may have other shapes or features without departing from the scope and spirit of the disclosed subject matter. For example, either the tooth or the lug, or both, may have other interlocking features, such as squared tongue and groove features. Flanks may extend from the tooth along sides of the lug for added structural support, thereby requiring less bolt strength for retention and anti-rotation. Thus, one skilled in the art will recognize that this mounting configuration provides flexibility in the placement and form of the cutting teeth, which may be full width, with both top and bottom of tooth contacting the cut, or recessed on one side and staggered such that only one side of the tooth only forms the cutting edge, or skewed so as to create a single cutting point.

The cutting edges of the tooth may be formed integrally with the cutting face or profile and coated with hard, cutting material. Alternatively, one or more separate cutting tips, such as straight pieces of carbide, may be attached across the width of the tooth at one, two or more upper edges to define the cutting face or profile of the tooth.

Thus, the tooth configuration and mounting arrangement disclosed herein yield positive and robust tooth positioning, while allowing several improvements over conventional saw discs. This has the benefit of being less sensitive to bending stresses, and thus less prone to cracking. In addition, less complex machining is needed for the fabrication of the teeth and saw disc. The design of the teeth and the mounting lugs eliminates small radii which simplifies machining operation and reduces associated stress concentrations, and thus the chance of cracking. The through holes in the teeth and the mounting lugs are clearance holes for the through bolts, which clamp the teeth to the mounting lugs, and therefore require less working since they do not need to be threaded or bored to a controlled dimension.

With reference now to the drawings, example saw disc assemblies, and the mounting arrangements for cutting teeth on the saw disc, will be described in the context of a work vehicle in the form of a track feller buncher having a saw disc felling head. While a tracked feller buncher is discussed herein as an example work vehicle, one skilled in the art will recognize that the configuration of the teeth and mounting arrangement disclosed herein may be readily adapted for use on other saw blade assemblies and/or cutting heads. As such, the present disclosure should not be limited to applications associated with a feller buncher or the disc saw felling head saw assembly.

Figure 1:
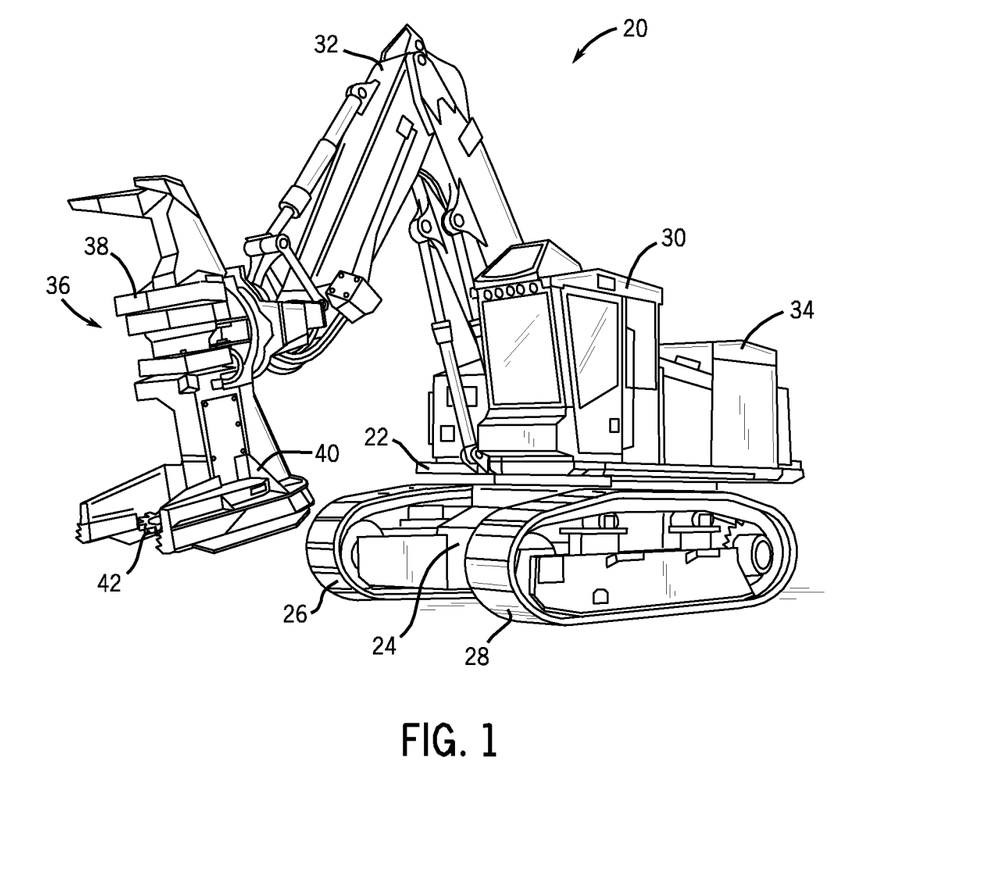
FIG. 1 is a perspective view of a work vehicle in the form of a tracked feller buncher having a disc saw felling head.

As shown in FIG. 1, a tracked feller buncher 20 may include a main frame 22 rotatably supported on an undercarriage 24 having a pair of tracks 26, 28. The main frame 22 has an operator cabin 30, an articulated boom 32 and a power plant 34 (e.g., a diesel engine) coupled to a drive train (not shown) for driving the tracks 26, 28. The power plant 34 may power a hydraulic pump (not shown), which pressurizes hydraulic fluid in a hydraulic circuit including various hydraulic valves and actuators for the articulated boom 32, as well as other implements on the tracked feller buncher 20, such as a disc saw felling head 36. The felling head 36 includes a grapple 38, which firmly grasps a tree, and a saw housing 40 supporting a rotating saw disc assembly 42, which cuts the tree.

Figures 2, 3:
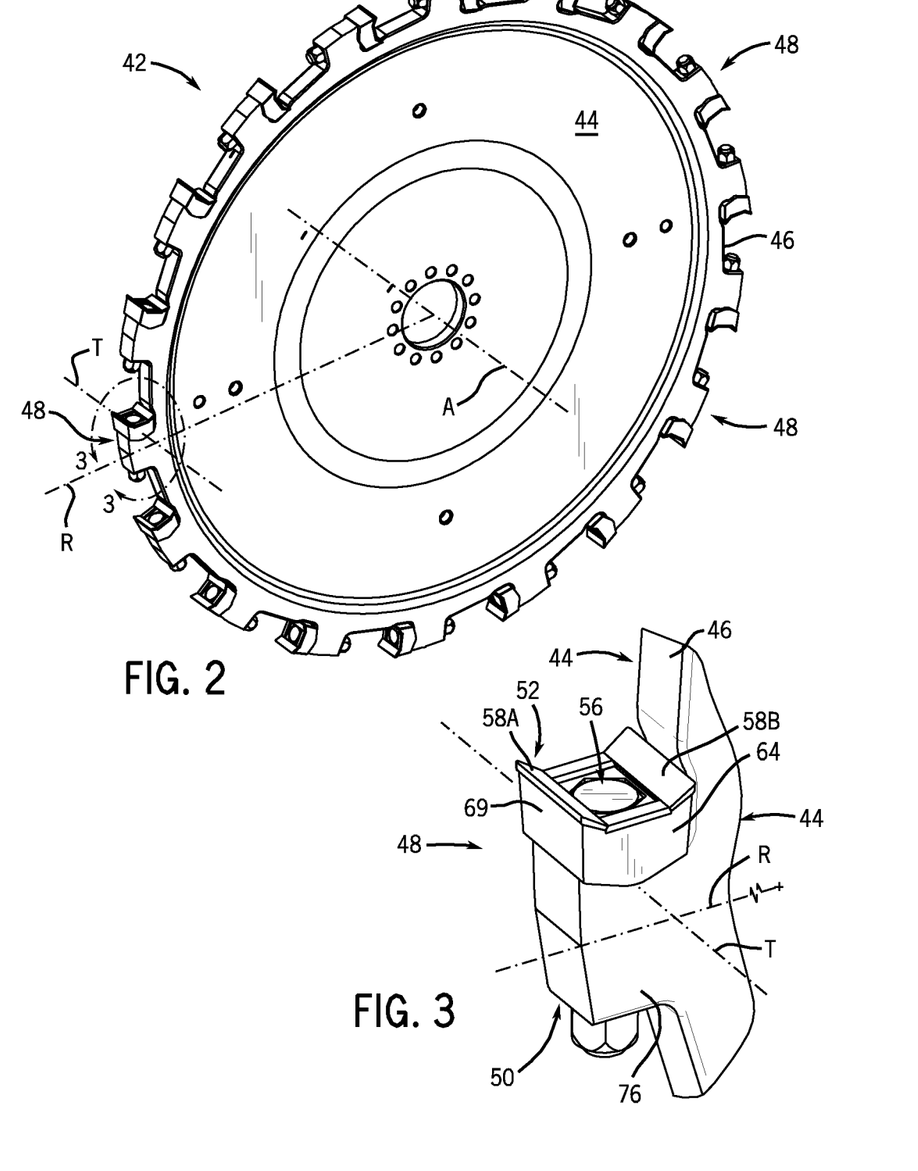
FIG. 2 is a perspective view of the saw disc for the felling head in the work vehicle shown in FIG. 1, the saw disc being shown turned to a vertical orientation from that shown in FIG. 1.
FIG. 3 is a partial perspective view of a tooth assembly as indicated at 3-3 in FIG. 2 having tooth and lug mounting profiles formed in an axial direction perpendicular to a plane of the saw disc.

With reference now to FIGS. 2 and 3, in certain embodiments the saw disc assembly 42 includes a circular plate 44 defining an outer peripheral edge 46. The circular plate 44 is concentric about a rotation axis A and centered on a reference plane which is perpendicular to the rotation axis A and includes a radius axis R of the plate 44. A plurality of tooth assemblies 48 extend radially out from the peripheral edge 46 and are evenly-spaced apart angularly along the outer peripheral edge 46. The size and number of tooth assemblies may be dictated by the size (e.g., diameter and/or plate thickness) and the particular application or cutting operations to be performed by the saw disc assembly 42. Each tooth assembly 48 includes a mounting lug 50 and a cutting tooth 52 mounted to the mounting lug 50 and secured thereto with a fastener 56. The mounting lugs 50 may be formed as an integral part of the plate 44 along the outer peripheral edge 46, as shown in the drawings, or alternately they may include a separate tooth holder (not shown) configured to secure the mounting lug 50 onto the outer peripheral edge 46, which in that case may be a simple circular circumference.

Figures 4, 5:
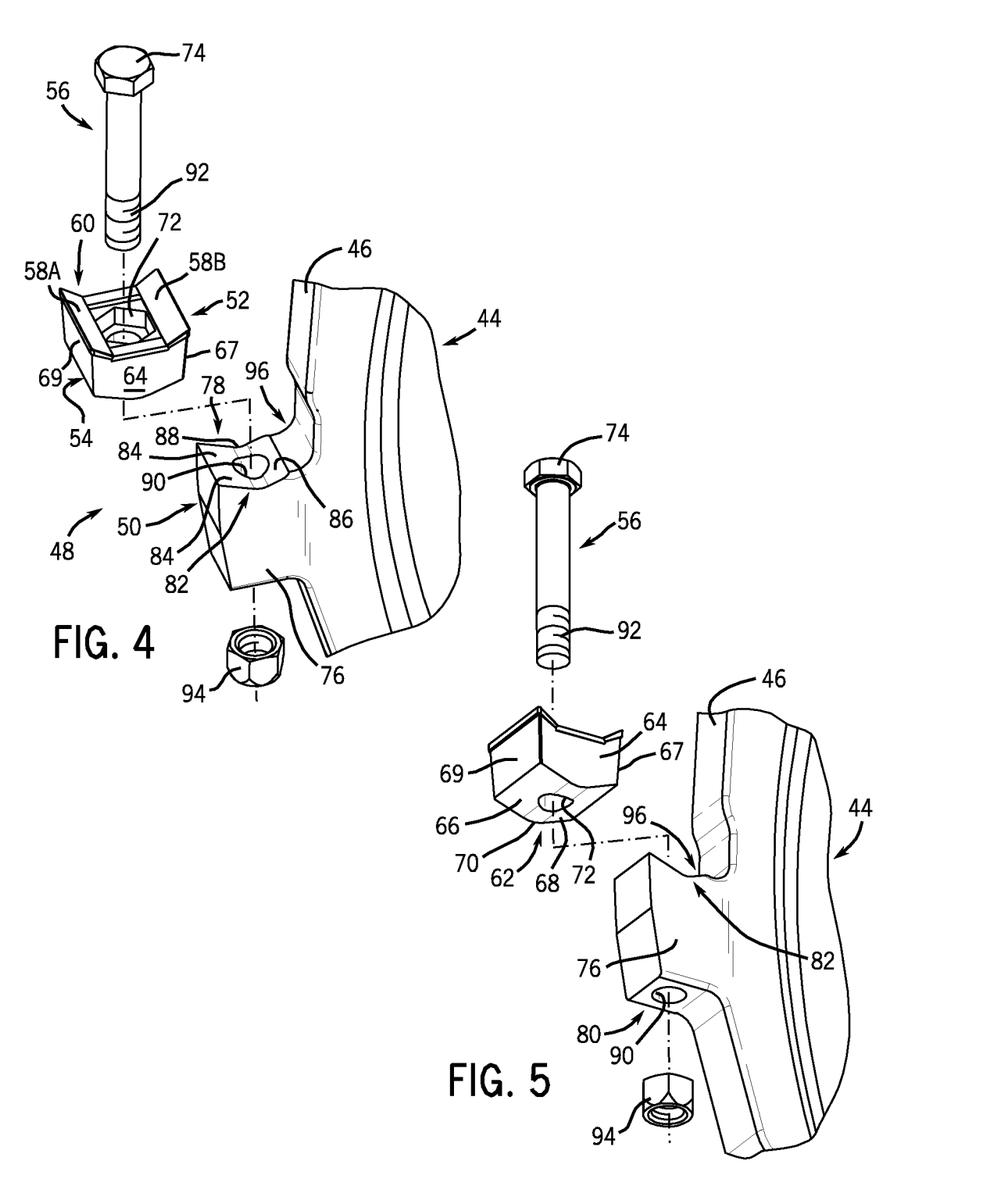
FIG. 4 is a partial exploded perspective view of the tooth assembly of FIG. 3.
FIG. 5 is another partial exploded perspective view of the tooth assembly of FIG. 3.
Figure 6:
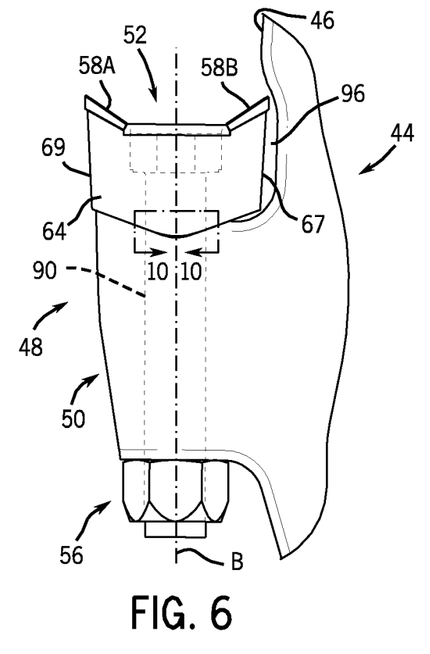
FIG. 6 is a partial side view of the tooth assembly of FIG. 3.
Figure 7:
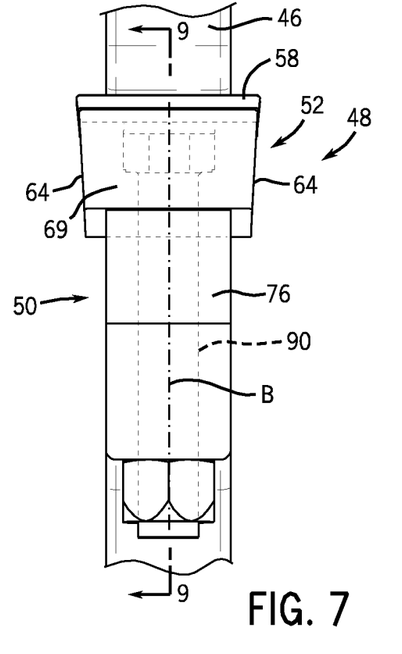
FIG. 7 is a partial end view of the tooth assembly of FIG. 3.
Figure 8:
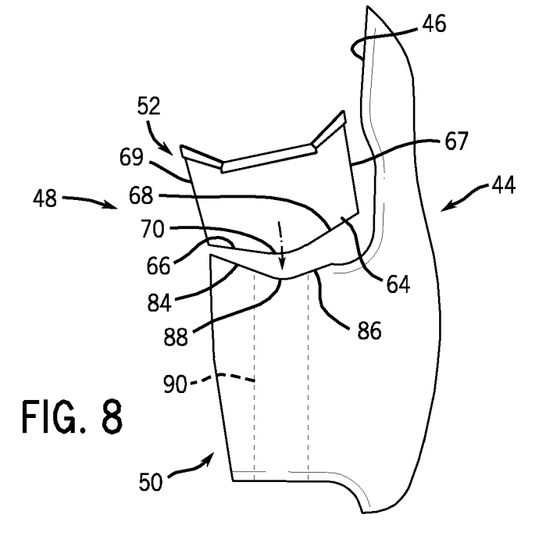
FIG. 8 is a partial side view of the tooth assembly similar to FIG. 3, showing the cutting tooth installation on the tooth mount.
Figure 9:
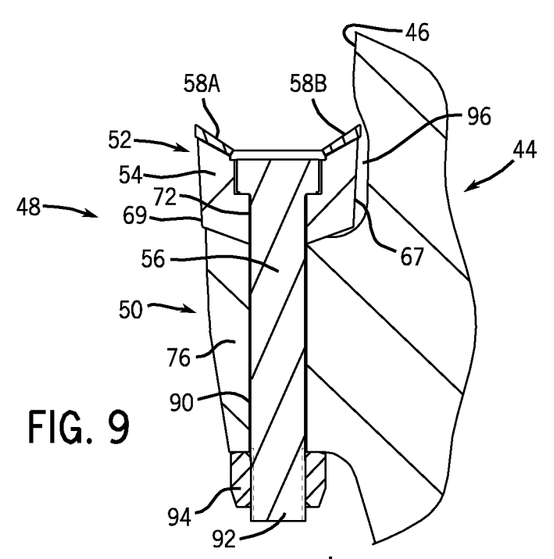
FIG. 9 is a cross-sectional view taken along line 9-9 of FIG. 7.

Referring now to FIGS. 3-10, each cutting tooth 52 includes a tooth body 54 having at least one cutting profile 58A, 58B formed in a portion of a cutting face 60 and a mounting face 62 formed on the tooth body 54 opposite the cutting face 60. Side walls 64 of the tooth 52 extend on opposite axial sides of the tooth 52 between the cutting face 60 and the mounting face 62 to further define the tooth body 54. The mounting face 62 has first and second flat or planar surfaces 66, 68, which define a generally V-shaped mounting profile, which in this example forms a mounting projection. The first and second planar surfaces 66, 68 extend uniformly across the axial dimension of the tooth body 54 between opposite sides of the cutting tooth 52 and are oriented to extend from a radially inner side 67 to a radially outer side 69 of the cutting tooth 52. A medial surface 70 extends between the first and second planar surfaces 66, 68 on the mounting face 62. A through bore 72 extends from the cutting face 60 through the mounting face 62 and is configured to receive the fastener 56. As shown in FIGS. 3 and 4, the through bore 72 has a counterbore section defining a multi-sided (e.g., hexagonal) recess formed in the cutting face 60 for receiving the hexagonal head 74 of the fastener 56 in the tooth body 54. In this way, the head 74 is recessed in the tooth body 54 and prevented from rotation relative to the tooth body 54. The through bore 72 extends along a bore axis B (shown in FIG. 6) passing through the cutting face 60 and the mounting face 62 and about which the first and second planar surfaces 66, 68 are symmetric. Other bore and counterbore configurations may be provided in the tooth body 54 depending on the type of fastener being used. One skilled in the art will recognize that the cutting tooth 52, and more specifically the tooth body 54, does not have a shank extending therefrom as is conventional for other cutting teeth. Thus, the cutting tooth 52, and the tooth body 54, may be considered shank-less.

As illustrated in FIGS. 3-10, in the present example, each mounting lug 50 includes a lug body 76 extending radially from the peripheral edge 46 of the plate 44 and defining a leading face 78 and a trailing face 80 relative to the direction of rotation of the plate 44. A tooth mount 82 is formed in the leading face 78 of the lug body 76. The tooth mount 82 includes first and second planar surfaces 84, 86 which define a generally V-shaped mounting profile, which in this example forms a mounting groove, and which extends along a tooth axis T of the lug body 76 and complements the first and second planar surfaces 66, 68 of the cutting tooth 52. The tooth axis T, as shown in FIG. 3, is generally perpendicular to the radius R, and the central plane of the plate 44, passing through the lug body 76 generally parallel to the axis of rotation A, shown in FIG. 2. A medial surface 88 is formed between the first and second planar surfaces 84, 86 on the tooth mount 82. A through bore 90 extends through the lug body 76 from the leading face 78 through the trailing face 80. The through bore 90 is generally perpendicular to the radius R extending through the lug body 76 and the tooth axis T.

As noted above, the cutting tooth 52 is mounted and secured to the mounting lug 50. Specifically, the first and second planar surface 66, 68 on the cutting tooth 52 are positioned in complementary engagement with the first and second planar surface 84, 86 of the mounting lug 50. The fastener 56 extends through the through bores 72 and 90 with the hexagonal head 74 recessed in the tooth body 54 and a threaded portion 92 extending past the trailing face 80 of the mounting lug 50. A nut 94 is threadably secured to the threaded portion 92 of the fastener 56 to engage the trailing face 80. Once tightened, the fastener 56 clamps the planar surfaces 66, 68 of the cutting tooth 52 onto the planar surfaces 84, 86 of the mounting lug 50. This clamping force, in combination with the configuration of the complimentary, V-shaped mounting profiles of the mounting face 62 and the tooth mount 82, maintain the proper alignment of the cutting edge of the cutting tooth 52 during cutting operations with the saw disc assembly 42. In other words, the first and second planar surfaces 66, 68 positively position the cutting tooth 52 and prevent rotation thereof with respect to the mounting lug 50 about the fastener 56.

Figure 10:
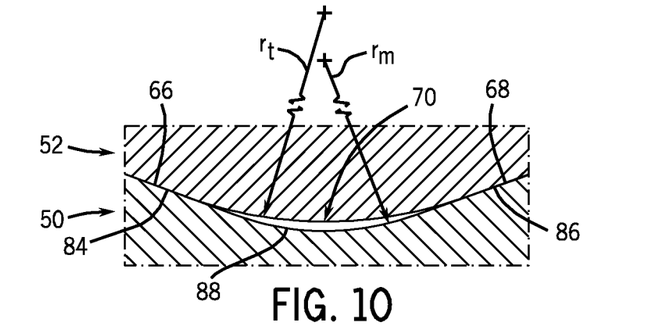
FIG. 10 is a sectioned detailed view showing an interface between the tooth mount and the cutting tooth.
Figure 11:
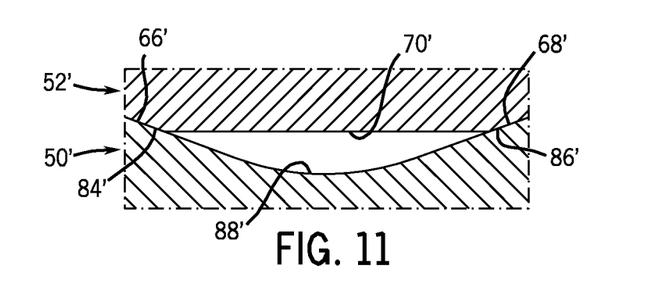
FIG. 11 is a sectioned detail view similar to FIG. 10 showing another example of the interface between the tooth mount and the cutting tooth.

As shown in FIGS. 10 and 11, the medial surface 70 of the cutting tooth 52 may be spaced away or relieved from the medial surface 88 of the mounting lug 50. In the configuration shown in FIG. 10, the medial surface 70 of the cutting tooth 52 has a radius rt which is greater than a radius rm of the medial surface 88 of the mounting lug 50. In the configuration shown in FIG. 11, the medial surface 70' of the cutting tooth 52' is formed by truncating or removing a portion of the mounting face 62' where the planar surfaces 66', 68' would otherwise intersect. Other configurations may be used, including mating the medial surfaces 70 and 88 along their entire surface areas, including along a centerline (not shown) at the bottom of the projection and valley where the planar surfaces of the tooth or lug intersect, provided the cutting tooth 52 is properly located on the mounting lug 50.

The cutting profile of each tooth may be of any suitable configuration and construction. In the illustrated example of FIGS. 3-10, the cutting face 60 includes two cutting edges or profiles 58A, 58B extending along opposite edges of the cutting face 60, such that the cutting profiles 58A and 58B are spaced apart in the radial direction of the saw disc assembly 42 when the cutting tooth 52 is mounted to the mounting lug 50. While the cutting profiles 58A, 58B as shown in the figures extend uniformly along the cutting face 60 between opposite axial sides of the cutting tooth 52, the cutting profiles 58A, 58B could be limited to a portion of the cutting face 60 and thus may more precisely be referred to as cutting tips. The cutting tooth 52 may be secured on the mounting lug 50 such that the first cutting profile 58A is positioned at a use location at the outward-most radial position of the tooth assembly 48 to provide a cutting edge and the second cutting profile 58B is positioned in a radial relief 96 formed in the outer peripheral edge 46 of the plate 44. As the first cutting profile 58A dulls from repeated use, the second cutting profile 58B may be then be substituted for the first.

The cutting profiles 58A, 58B may be indexed in a simple and rapid manner by loosening the fastener 56 sufficiently, which may be complete removal or loosening short of removal of the fastener, so that cutting tooth 52 may be rotated relative to the mounting lug 50 through 180 degrees so the second cutting profile 58B is located in the use position. Once rotated, the fastener 56 may be re-tightened such that the planar surfaces 66, 68 of the cutting tooth 52 are respectively clamped onto the planar surfaces 84, 86 of the mounting lug 50. Additionally, side surfaces, primarily inner radial side 67, of the cutting tooth 52 are spaced from the mounting lug 50 and the outer peripheral edge 46 of the plate 44. In the illustrated example, this gap clearance is provided by the relief 96 in the outer peripheral edge 46 of the plate 44. In this configuration, spacing of the cutting tooth 52 in the radial dimension can be reduced, such that the radial inner side 67 of the cutting tooth 52 may lie radially inward (toward the axis of rotation R) of the nominal outer diameter of the plate 44, along which lie arcuate portions of the outer peripheral edge 46 between the relief 96 and a consecutive mounting lug 50.

The tooth assembly 48 and more specifically the mounting profiles on the mounting face 62 and the tooth mount 82 have been described in terms of an example V-shaped profile which is aligned in the axial direction of the saw disc. One skilled in the art should, however, appreciate that these mounting profiles may be modified and/or varied without departing from the scope and spirit of this disclosure. In this regard, it will be recognized that the mounting profile includes a feature or features that provide for a positive positioning of the cutting tooth relative to the mounting lug and sufficient surface area to generate adequate clamping forces therebetween. With reference now to FIGS. 12-17, additional embodiments of the tooth assembly are described, wherein like reference numbers incremented by 100 are used to identify elements similarly found in the embodiment illustrated in FIGS. 3-10.

Figure 12:
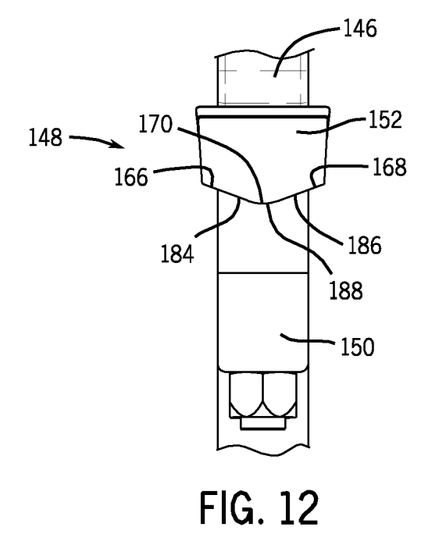
FIG. 12 is a partial end view of a tooth assembly similar to FIG. 7 having tooth and lug mounting profiles formed along a radial axis of the saw disc.
Figure 13:
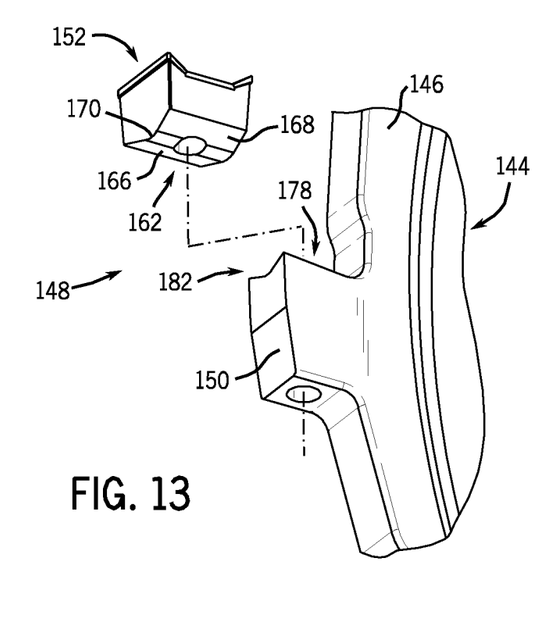
FIG. 13 is a partial exploded perspective view similar to FIG. 5 showing the tooth assembly of FIG. 12.

FIGS. 12 and 13 illustrate another example embodiment of a tooth assembly 148 formed on an outer peripheral edge 146 of a plate 144. The tooth assembly 148 includes a cutting tooth 152 having a mounting face 162 including first and second planar surfaces 166, 168 and a medial surface 170 forming a V-shaped mounting profile oriented along a radial axis of the plate 144. The tooth assembly 148 also includes a mounting lug 150 having a tooth mount 182 formed in a leading face 178. The tooth mount 182 has first and second planar surfaces 184, 186 and a medial surface 188 forming a V-shape mounting profile to engage the mounting face 162 of the cutting tooth 152 in complementary fashion. In this regard, the tooth assembly 148 shown in FIGS. 12 and 13 is similar to the tooth assembly 48 described above in reference to FIGS. 3-10 with the primary exception being that the V-shaped mounting profiles of the tooth assembly 148 are radially arranged with respect to the plate 144 as compared to the V-shaped profiles of the tooth assembly 48 being axially arranged. In this way, the first and second planar surfaces 166, 168 are oriented to extend between opposite axial sides of the mounting lug 150.

Figure 14:
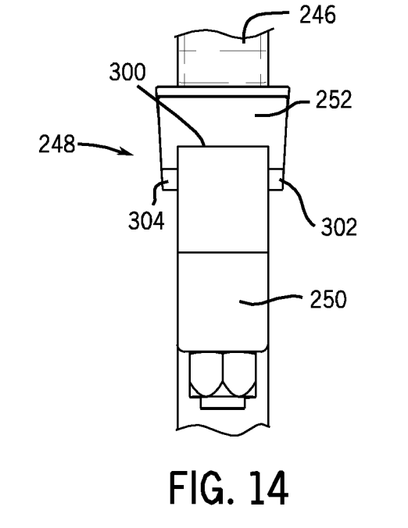
FIG. 14 is a partial end view of a tooth assembly similar to FIG. 7 having tooth mounting profiles which further includes a channel formed in the cutting tooth along the radial axis.
Figure 15:
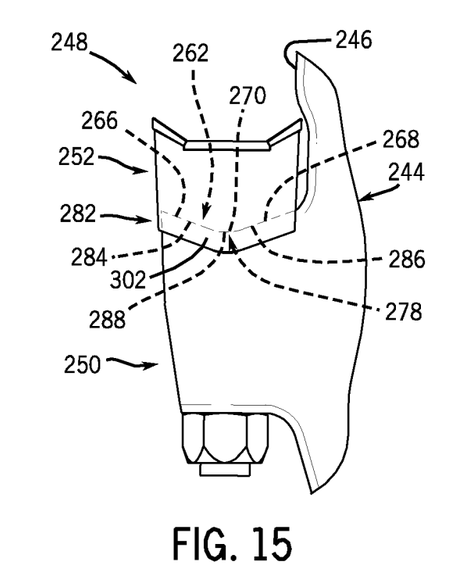
FIG. 15 is a partial side view similar to FIG. 6 showing the tooth assembly of FIG. 14.

FIGS. 14 and 15 illustrate another example embodiment of a tooth assembly 248 formed on an outer peripheral edge 246 of a plate 244. The tooth assembly 248 includes a cutting tooth 252 having a mounting face 262 including a channel 300 for receiving a leading face 278 of a mounting lug 250. First and second planar surfaces 266, 268 and a medial surface 270 are formed in the channel 300 and define a V-shaped mounting profile axially oriented with respect to the mounting lug 250. The channel 300 is oriented 90 degrees from the mounting face 262. The mounting lug 250 has a tooth mount 282 formed in the leading face 278 received in the channel 300. The marginal sides of the cutting tooth 252 form flanks 302, 304, which extend over the mounting lug 250 past the leading face 278 and provide additional structure for securely supporting the cutting tooth 252 on the mounting lug 250. In this way, the mounting lug 250 functions as a rib extending into the channel 300. The tooth mount 282 has first and second planar surfaces 284, 286 and a medial surface 288 forming a V-shape mounting profile to engage the mounting face 262 of the cutting tooth 252 in complementary fashion. The tooth assembly 248 shown in FIGS. 14 and 15 is similar to the tooth assembly 48 described above in reference to FIGS. 3-10 with the primary exception being that the mounting face 262 is notched to provide an additional mechanical interface between the mounting lug 250 and the cutting tooth 252.

Figure 16:
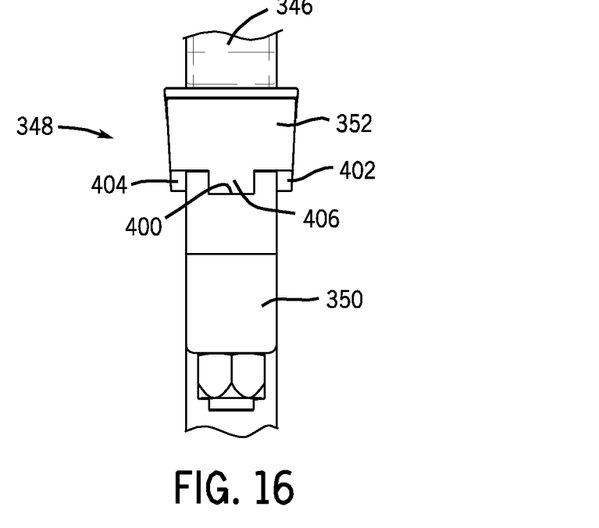
FIG. 16 is a partial end view of a tooth assembly similar to FIG. 7 having mounting profiles which further include a rib formed on the tooth and a channel formed in the mounting lug, the rib and channel arranged along the radial axis.
Figure 17:
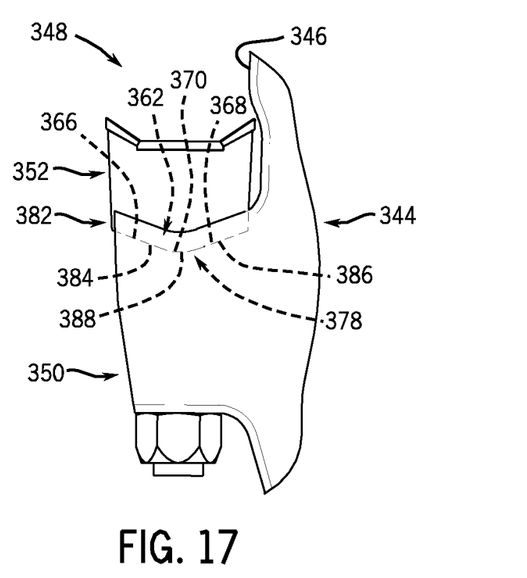
FIG. 17 is a partial side view similar to FIG. 6 showing the tooth assembly of FIG. 16.

FIGS. 16 and 17 illustrate yet another example embodiment of a tooth assembly 348 formed on an outer peripheral edge 346 of a plate 344. The tooth assembly 348 includes a cutting tooth 352 having a mounting face 362 with first and second planar surfaces 366, 368 and medial surface 370 formed therein to define a V-shaped mounting profile oriented along a tooth axis generally parallel with the rotation axis of the saw disc. A rib 406 extends from a central portion of the mounting face 362 of the cutting tooth 352. In other words, the rib 406 projects away from the tooth body farther at a central region of the mounting face 362 than at opposite side regions of the mounting face 362 where the first and second planar surfaces 366, 368 are located. The tooth assembly 248 also includes a mounting lug 350 having a tooth mount 382 formed in a leading face 378 with a channel 400 configured to receive the rib 406. The rib 406 extends past the leading face 378 into the channel 400 and provides additional structure for securely supporting the cutting tooth 352 on the mounting lug 350. In particular, the marginal sides of the mounting lug 350 form flanks 402, 404 that extend over the rib 406 to provide additional structure for securely supporting the cutting tooth 352 on the mounting lug 350. The tooth mount 382 includes first and second planar surfaces 384, 386 and a medial surface 388 forming a V-shape mounting profile to engage the mounting face 362 of the cutting tooth 352 in complementary fashion. In this regard, the tooth assembly 348 shown in FIGS. 16 and 17 is similar to the tooth assembly 48 described above in reference to FIGS. 3-10 with the exception that the leading face 378 has a channel 400 formed therein to receive the rib 406 extending from the mounting face 362 to provide an additional mechanical interface between the mounting lug 350 and the cutting tooth 352.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A cutting device, comprising:
a circular plate concentric about a rotation axis and having an outer peripheral edge defining a plurality of mounting lugs extending radially out from the outer peripheral edge and spaced apart angularly along the outer peripheral edge, the mounting lugs each defining a first mounting profile forming a V-shaped groove with first and second flat mount surfaces extending from a first side to a second side opposite the first side of each mounting lug in an axial direction of the circular plate such that the V-shaped groove extends axially from the first side to the second side of each mounting lug, the outer peripheral edge defining a plurality of reliefs and a plurality of convex arcuate sections, each relief forming a radially inwardly extending circumferential recess in the outer peripheral edge extending from one of the plurality of mounting lugs to one of the plurality of convex arcuate sections, each convex arcuate section extending from one of the plurality of reliefs to one of the plurality of mounting lugs and together with the one of the plurality of reliefs spanning a distance between consecutive ones of the plurality of mounting lugs;
a plurality of teeth, each tooth mounted to a respective one of the mounting lugs and defining a second mounting profile opposite a cutting profile of the tooth, the second mounting profile having first and second flat tooth surfaces extending between first and second sides of each tooth in the axial direction of the circular plate, and a radially inner side of each tooth is radially spaced from the outer peripheral edge of the circular plate by a gap clearance defined by each relief; and
a plurality of fasteners each coupling one of the plurality of teeth to one of the plurality of mounting lugs, each of the fasteners mounting the respective one of the plurality of teeth and clamping the flat tooth surfaces thereof against the flat mount surfaces of the respective mounting lug;
wherein the gap clearance of each relief extends radially inwardly closer to the rotation axis than the plurality of convex arcuate sections and extends radially outwardly at least as far as the cutting profile of each tooth so that each tooth is spaced from the outer peripheral edge of the circular plate.

2. The cutting device of claim 1, wherein each tooth is configured to mount to one of the mounting lugs in two alternative orientations to alternatively position one of a plurality of cutting tips of the cutting profile at a radially outward position with respect to another of the plurality of cutting tips.

3. The cutting device of claim 1, wherein the cutting profile of each tooth includes two spaced apart cutting tips extending across the tooth uniformly to the first and second sides of the tooth.

4. The cutting device of claim 1, wherein a through hole extends along a centerline passing through the cutting profile and the second mounting profile of each tooth.

5. A cutting device, comprising:
a circular plate concentric about a rotation axis and having an outer peripheral edge defining a plurality of mounting lugs extending radially out from the outer peripheral edge and spaced apart angularly along the outer peripheral edge, the mounting lugs each defining a first mounting profile forming a V-shaped groove with first and second flat mount surfaces extending from a first side to a second side opposite the first side of each mounting lug in an axial direction of the circular plate such that the V-shaped groove extends axially from the first side to the second side of each mounting lug, the outer peripheral edge defining a plurality of reliefs and a plurality of convex arcuate sections, each relief forming a radially inwardly extending circumferential recess in the outer peripheral edge extending from one of the plurality of mounting lugs to one of the plurality of convex arcuate sections, each convex arcuate section extending from one of the plurality of reliefs to one of the plurality of mounting lugs and together with the one of the plurality of reliefs spanning a distance between consecutive ones of the plurality of mounting lugs;
a plurality of teeth, each tooth mounted to a respective one of the mounting lugs and defining a second mounting profile opposite a cutting profile of the tooth, the second mounting profile having first and second flat tooth surfaces extending between first and second sides of each tooth in the axial direction of the circular plate, and a radially inner side of each tooth is radially spaced from the outer peripheral edge of the circular plate by a gap clearance defined by each relief; and
a plurality of fasteners each coupling one of the plurality of teeth to one of the plurality of mounting lugs, each of the fasteners mounting the respective one of the plurality of teeth and clamping the flat tooth surfaces thereof against the flat mount surfaces of the respective mounting lug;
wherein for each tooth the second mounting profile projects away from the cutting profile farther at a central region of the second mounting profile than at opposite side regions of the second mounting profile where the first and second flat tooth surfaces are located; and
wherein the radially inner side of each tooth is at a radial distance from the rotation axis that is at least as close to the rotation axis as the plurality of convex arcuate sections of the outer peripheral edge.

6. A cutting device, comprising:
a circular plate concentric about a rotation axis and having an outer peripheral edge defining a plurality of mounting lugs extending radially out from the outer peripheral edge and spaced apart angularly along the outer peripheral edge, the mounting lugs each defining a first mounting profile forming a V-shaped groove with first and second flat mount surfaces extending from a first side to a second side opposite the first side of each mounting lug in an axial direction of the circular plate such that the V-shaped groove extends axially from the first side to the second side of each mounting lug, the outer peripheral edge defining a plurality of reliefs and a plurality of convex arcuate sections, each relief forming a radially inwardly extending circumferential recess in the outer peripheral edge extending from one of the plurality of mounting lugs to one of the plurality of convex arcuate sections, each convex arcuate section extending from one of the plurality of reliefs to one of the plurality of mounting lugs and together with the one of the plurality of reliefs spanning a distance between consecutive ones of the plurality of mounting lugs;

a plurality of teeth, each tooth mounted to a respective one of the mounting lugs and defining a second mounting profile opposite a cutting profile of the tooth, the second mounting profile having first and second flat tooth surfaces extending between first and second sides of each tooth in the axial direction of the circular plate, and a radially inner side of each tooth is radially spaced from the outer peripheral edge of the circular plate by a gap clearance defined by each relief; and a plurality of fasteners each coupling one of the plurality of teeth to one of the plurality of mounting lugs, each of the fasteners mounting the respective one of the plurality of teeth and clamping the flat tooth surfaces thereof against the flat mount surfaces of the respective mounting lug;

wherein the radially inner side of each tooth is at a radial distance from the rotation axis that is at least as close to the rotation axis as the plurality of convex arcuate sections of the outer peripheral edge.

\* \* \* \* \*